UNITED STATES PATENT OFFICE.

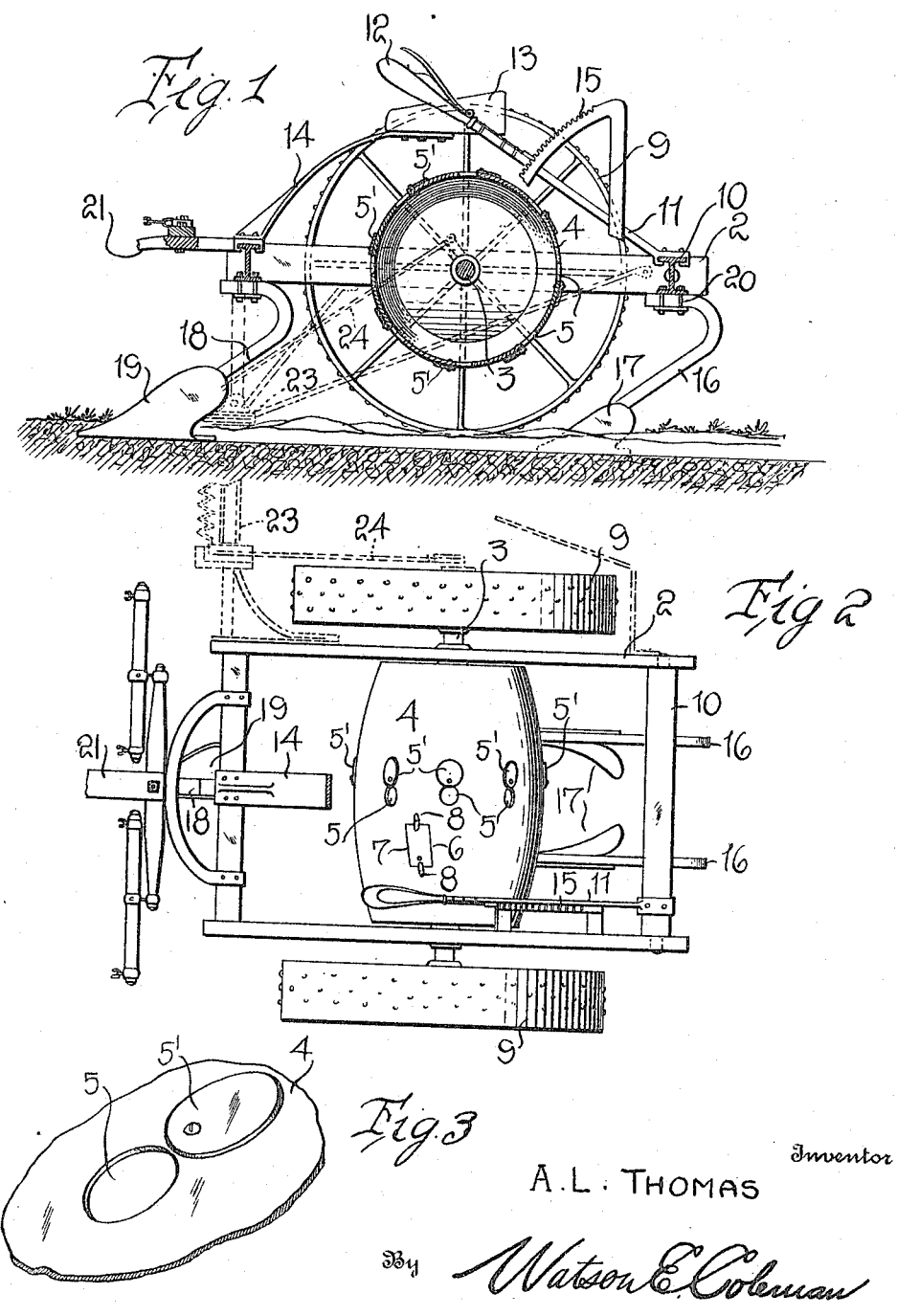

ALTA LEE THOMAS, OF WEISER, IDAHO.

COMBINED PLANTER AND CULTIVATOR.

1,216,377. Specification of Letters Patent. Patented Feb. 20, 1917.

Application filed June 10, 1916. Serial No. 102,998.

*To all whom it may concern:*

Be it known that I, ALTA L. THOMAS, a citizen of the United States, residing at Weiser, in the county of Washington and State of Idaho, have invented certain new and useful Improvements in Combined Planters and Cultivators, of which the following is a specification, reference being had to the accompanying drawings.

My invention relates to agricultural implements, and particularly to planters.

The primary object of my invention is to provide a mechanism which is particularly adapted to planting potatoes and which is also adapted for planting corn or other seed.

A further object of my invention is to provide, in connection with a planting mechanism, a furrow opener and seed coverers which may be used for cultivating crops when no planting is done.

Other objects will appear in the course of the following description.

My invention is illustrated in the accompanying drawings, wherein:

Figure 1 is a longitudinal sectional view of my planter;

Fig. 2 is a top plan view; and

Fig. 3 is a fragmentary perspective view of one of the openings 5 and the lid 5'.

Referring to these drawings, 2 designates the main frame of the planter through which passes an axle 3 supporting a barrel 4. This barrel is preferably smaller in diameter at its ends than at its middle so that the potatoes, seed, or other material contained within the barrel will naturally gravitate toward the middle thereof. At its largest diameter the barrel is formed with a plurality of discharge openings 5 these openings being controlled by a lid 5' which is preferably hinged and which may be shifted so as to entirely uncover these openings or partially close them, or close them entirely. The barrel is also formed with an opening 6 closed by a lid 7, this lid being preferably inset into the barrel so that its inner face will be flush with the inner face of the barrel, the lid being supported in position by means of buttons 8.

The axle 3 is mounted upon the supporting traction wheels 9 of any suitable character. These wheels rotate with the shaft 3 and the rotation of the shaft 3 is communicated to the drum or barrel 4, this drum or barrel being preferably keyed upon the shaft to rotate therewith. The side members of the frame 2 are connected to each other at front and rear by transversely extending braces 10 of any suitable construction but shown as in the form of I-beams. The rear I-beam 10 is preferably rotatably mounted in the ends of the side pieces of the frame and has attached thereto an operating lever 11 which extends upward and forward so that its handle 12 is adjacent to a seat 13 which is mounted by means of a downwardly extending brace 14 upon the forward I-beam 10. The lever 11 operates over a sector rack 15 or is provided with any other suitable means for adjusting.

Attached to the rear beam 10 and depending therefrom are the standards 16 which extend downward and forward and carry at their lower ends the covering shares or plows 17 which act to cast the earth toward the middle of the machine. Upon the forward transverse cross bar 10 there is mounted the plow standard 18 which carries upon its lower end the furrow opener 19 of any suitable form. This furrow opener is preferably disposed in line with the openings 4 in the barrel or drum. The standard of the furrow opener and the standard of the covering shares or plows are detachably connected to the beams 10 by means of the cap 20 so that they may be removed or adjusted. To the forward cross bar 10 there is connected the tongue 21 or any other suitable draft appliance.

Preferably the frame 2 is adapted to support the cutter bar 23 of a mowing machine, the cutter bar being actuated in any suitable manner from the axle by a pitman 24. This cutter bar and the mechanism whereby it is actuated has any usual or suitable form, the object being to permit the machine to be used as a mowing machine when it is not in use as a planter or cultivator.

The operation of the invention will be obvious. The barrel or drum 4 is intended to be filled with seed potatoes or with corn or other seed to be planted. The lids 5' are adjusted over the openings 5 in consonance with the material to be planted. The machine is then driven along the field and as the drum rotates the seed will drop out through the openings and into the furrow formed by the furrow opener 19. The plow shares 17 following the planter will turn the earth over the seed. Because of the peculiar form of the drum the seed will gravitate toward the center of the drum and feed properly through the openings 5. Certain of the openings 5 may be closed entirely, if desired, so as to plant the seed at greater distances than where all of the openings are uncovered. My improved machine is adapted to be used either as a planter or as a cultivator, cultivator shovels being placed upon the standards 16 and 18 for that purpose and the standards adjusted in any suitable manner. When the machine is not being used either as a planter or cultivator it may be used as a mowing machine. My machine is very simple, may be cheaply made, and will be of great convenience upon small farms.

Having described my invention, what I claim is:

A machine of the character described comprising a frame consisting of oppositely disposed longitudinal members and forward and rear beams connecting said members, the rearmost beam being rotatably connected to the members, an axle passing through the frame, traction wheels mounted thereon, a seed planting device mounted upon and rotatable with the axle, a seat support mounted upon the forward beam and extending upward and rearward to a point approximately above the axle, downwardly and forwardly extending standards mounted upon the rear beam and rotatable therewith and carrying furrow closers, a lever mounted upon the rear beam and extending toward the seat, and means for holding the lever in any adjusted position, said standards being longitudinally adjustable upon the rear beam.

In testimony whereof I hereunto affix my signature in the presence of two witnesses.

Mrs. ALTA LEE THOMAS.

Witnesses:
 E. R. COUTH,
 FRANK HAINS.

Copies of this patent may be obtained for five cents each, by addressing the "Commissioner of Patents, Washington, D. C."